(12) United States Patent
Guy

(10) Patent No.: US 8,342,539 B2
(45) Date of Patent: Jan. 1, 2013

(54) CLAMPING TOOL

(75) Inventor: Hanoch Guy, Petach Tikva (IL)

(73) Assignee: Iscar, Ltd., Tefen (IL)

( * ) Notice: Subject to any disclaimer, the term of this patent is extended or adjusted under 35 U.S.C. 154(b) by 1055 days.

(21) Appl. No.: 12/332,773

(22) Filed: Dec. 11, 2008

(65) Prior Publication Data

US 2009/0184479 A1 Jul. 23, 2009

(30) Foreign Application Priority Data

Jan. 23, 2008 (IL) .......................................... 188985

(51) Int. Cl.
*B23B 31/11* (2006.01)
*B25G 3/30* (2006.01)

(52) U.S. Cl. ............... 279/101; 279/7; 279/99; 409/234

(58) Field of Classification Search .................. 279/7, 8, 279/99–101; 403/343; 409/234, 236, 232; *B23B 31/11; B25G 3/30*
See application file for complete search history.

(56) References Cited

U.S. PATENT DOCUMENTS

| | | | | | |
|---|---|---|---|---|---|
| 805,402 | A | * | 11/1905 | Akins | 279/101 |
| 1,024,310 | A | * | 4/1912 | Canfield | 175/320 |
| 1,085,515 | A | * | 1/1914 | Wills | 279/101 |
| 1,157,596 | A | * | 10/1915 | Sherman | 411/269 |
| 1,253,149 | A | * | 1/1918 | Childers | 285/114 |
| 1,312,825 | A | * | 8/1919 | Bowery | 251/361 |
| 2,330,686 | A | * | 9/1943 | Cornell et al. | 403/333 |
| 2,598,109 | A | * | 5/1952 | Chasar | 279/7 |
| 2,598,423 | A | * | 5/1952 | Pealer | 279/7 |
| 2,702,715 | A | * | 2/1955 | Forrest | 285/32 |
| 4,040,765 | A | * | 8/1977 | Vig | 408/239 A |
| 4,621,960 | A |   | 11/1986 | Toellner |  |
| 4,854,764 | A | * | 8/1989 | Faber et al. | 403/13 |
| 5,758,883 | A |   | 6/1998 | Brian |  |
| 6,280,126 | B1 | * | 8/2001 | Slocum et al. | 409/141 |
| 6,494,648 | B2 | * | 12/2002 | Harpaz | 407/30 |

FOREIGN PATENT DOCUMENTS

| | | |
|---|---|---|
| DE | 39 12 503 | 3/1990 |
| EP | 0 048 578 | 3/1982 |

OTHER PUBLICATIONS

International Search Report in PCT/IL2008/001611, dated Jul. 6, 2009.

\* cited by examiner

*Primary Examiner* — Eric A Gates
(74) *Attorney, Agent, or Firm* — Womble Carlyle

(57) ABSTRACT

A clamping tool includes a holder, a connector and a tool. The holder has a rearwardly tapering bore and a holder thread having a first pitch. The connector has a cylindrical shape and a connector through bore. The connector further has a first connector thread having a pitch similar to the first pitch, and a second connector thread having a second pitch that is different from the first pitch. The tool has a rearwardly tapering rear portion and a tool thread having a pitch similar to the second pitch. In an assembled position, the rearwardly tapering rear portion of the tool abuts the rearwardly tapering bore of the holder, the holder thread is threadingly engaged with the first connector thread, and the tool thread is threadingly engaged with the second connector thread.

25 Claims, 10 Drawing Sheets

CLAMPING TOOL

FIELD OF THE INVENTION

The present invention relates to a clamping tool that has differential thread fastening means.

BACKGROUND OF THE INVENTION

It is known in the art to use an apparatus having differential thread fastening means, i.e., threads having different pitches, for clamping a cutting tool. Such an apparatus is shown, for example, in U.S. Pat. No. 5,758,883.

As shown in '883, an apparatus for adjusting the grip of a tubular collet upon a rotary tool is disclosed. The apparatus comprises a holder, a collet, a rotary tool and a rotatable connector member. The connector member has a first thread connection having a first pitch for threadingly engaging the collet, and a second thread connection having a second pitch for threadingly engaging the holder.

When the connector member is rotated, the collet is axially displaced into a tapered portion of the holder. The collet is provided with longitudinally extending slits so that further rotation of the connector member will cause the collet to radially close upon the shaft of the rotary tool and thus clamp the rotary tool within the collet.

In order to operate in an accurate and stable manner, the apparatus of '883 has to be designed to deal with several degrees of freedom, i.e., taking into consideration the dimensions and tolerances of the various parts. A first degree of freedom is defined between the tapered portions of the collet and of the holder. A second degree of freedom is defined in the first thread connection between the connector member and the collet. A third degree of freedom is defined in the second thread connection between the connector member and the holder. A fourth degree of freedom is defined in the slits of the collet. A fifth degree of freedom is defined between the bore of the collet and the shaft of the rotary tool retained therein.

Since there are involved several degrees of freedom between various parts, it negatively affects the possibility to have an accurate and stable clamping. This relates particularly to the slits of the collet and to the space between the bore of the collet and the shaft of the cutting tool. Furthermore, it may negatively affect the rigidity and clamping force by which the shaft of the cutting tool is clamped within the bore of the collet.

SUMMARY OF THE INVENTION

In accordance with the present invention there is provided a clamping tool having an axis of rotation and comprising:

a holder having a rearwardly tapering bore that extends rearwardly from a front end of the holder, the rearwardly tapering bore tapering rearwardly at a first angle, the holder is provided with a holder thread having a first pitch;

a connector having a generally cylindrical shape and a connector through bore that extends from a front end of the connector to a rear end of the connector, the connector has a first connector thread having a pitch similar to the first pitch, and, a second connector thread having a second pitch, the second pitch being different from the first pitch;

a tool having a rearwardly tapering rear portion, the rearwardly tapering rear portion tapering rearwardly at a second angle, the tool is provided with a tool thread having a pitch similar to the second pitch; wherein in an assembled position:

the rearwardly tapering rear portion of the tool abuts the rearwardly tapering bore of the holder, the holder thread is threadingly engaged with the first connector thread, and the tool thread is threadingly engaged with the second connector thread.

According to a specific embodiment of the present invention, the tool has a rearwardly facing annular surface located forward to the rearwardly tapering rear portion, the holder has a forwardly facing annular surface located forward to the rearwardly tapering bore, and wherein in the assembled position the rearwardly facing annular surface of the tool abuts the forwardly facing annular surface of the holder.

Typically, the tool is a cutting tool.

Generally, the first angle is equal to the second angle.

According to a first embodiment of the present invention, the first angle is larger than the second angle.

Typically, the first angle is larger than the second angle by a first difference value that is in the range of 0° to 0.01°.

Further typically, the first difference value is in the range of 0.002° to 0.004°.

Still further typically, the first difference value is approximately 0.003°.

According to a second embodiment of the present invention, the first angle is smaller than the second angle.

Typically, the first angle is smaller than the second angle by a second difference value that is in the range of 0° to 0.01°.

Further typically, the second difference value is in the range of 0.002° to 0.004°.

Still further typically, the second difference value is approximately 0.003°.

If desired, the holder thread is an internal thread.

Further if desired, the holder thread is an external thread.

According to a third embodiment of the present invention, the first connector thread has a first diameter, the second connector thread has a second diameter, and the first diameter is equal to the second diameter.

According to a fourth embodiment of the present invention, the first connector thread has a first diameter, the second connector thread has a second diameter, and the first diameter is different from the second diameter.

Typically, the first diameter is larger than the second diameter.

In some embodiments, the first connector thread has a third diameter, the second connector thread has a fourth diameter and the third diameter is equal to the fourth diameter.

In other embodiments, the third diameter is different from the fourth diameter.

In some embodiments, the first connector thread is an external thread and the second connector thread is an internal thread.

According to a specific embodiment of the present invention, the first pitch is larger than the second pitch.

Typically, the first pitch is larger than the second pitch by a pitch difference value that is in the range of 0 mm to 1 mm.

According to a fifth embodiment of the present invention, the rearwardly facing annular surface of the tool tapers forwardly at a third angle from a periphery of the rearwardly facing annular surface to a tool axis.

According to a sixth embodiment of the present invention, the rearwardly tapering rear portion of the tool has a rearwardly extending locating protrusion at a rear end thereof, the rearwardly tapering bore of the holder has a rearwardly extending locating recess at a rear end thereof, and wherein in the assembled position the locating protrusion is located within the locating recess and adapted thereto.

Advantageously, the rearwardly tapering rear portion of the tool has a tool bore that extends forwardly from a rear end of the rearwardly tapering rear portion.

If desired, the tool bore is a through bore.

According to a seventh embodiment of the present invention, the rearwardly tapering rear portion of the tool constitutes a peripheral surface of a tool adaptor, the tool adaptor has an adaptor bore that extends rearwardly from a front end of the tool adaptor, and, a tool shank is interchangeably retained within the adaptor bore.

Advantageously, in an unassembled position of the clamping tool, the tool shank is securely retained within the adaptor bore.

Typically, the tool shank is securely retained within the adaptor bore by a shrink fit connection.

BRIEF DESCRIPTION OF THE DRAWINGS

For a better understanding of the present invention and to show how the same may be carried out in practice, reference will now be made to the accompanying drawings, in which.

DETAILED DESCRIPTION OF THE INVENTION

Figure 1:
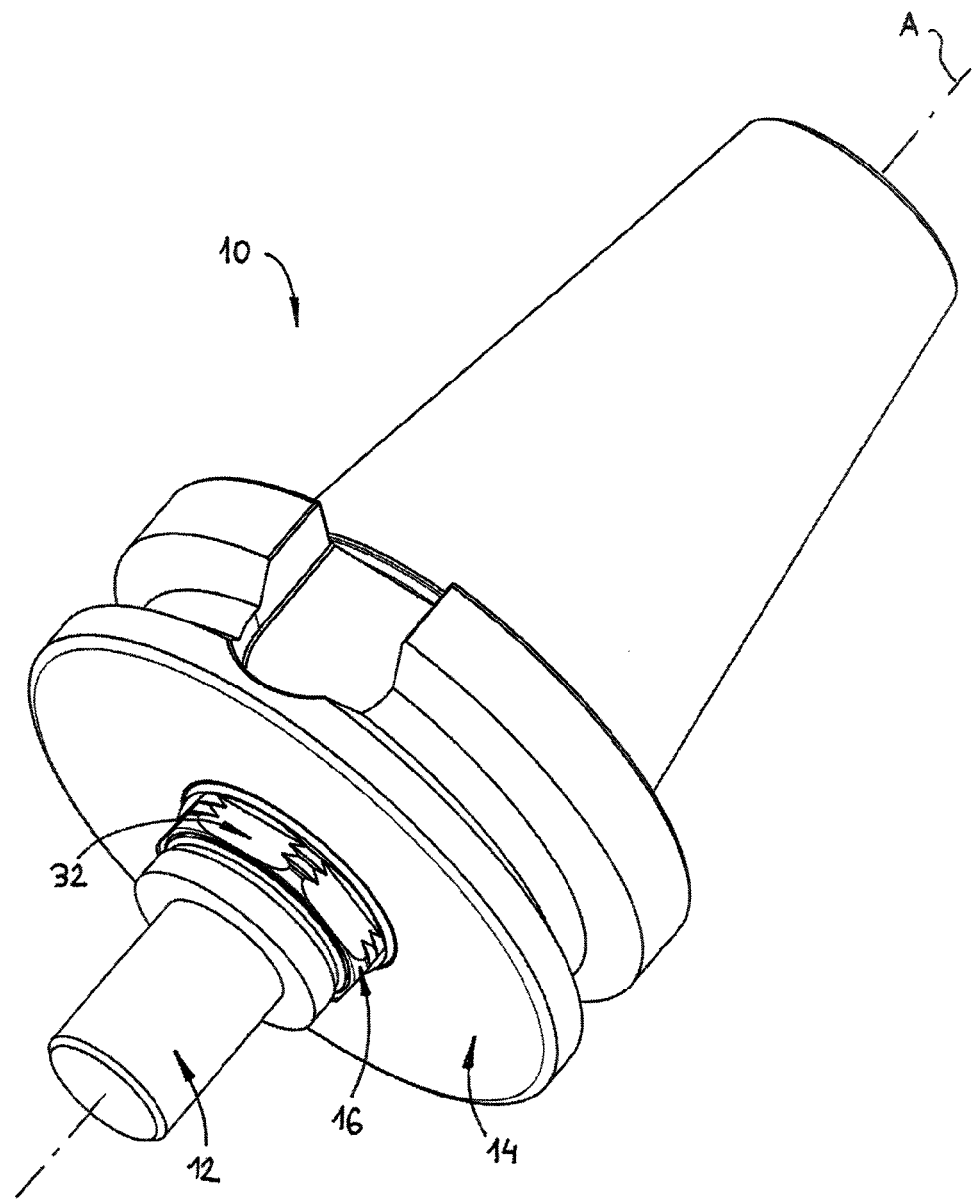
FIG. 1 is a perspective view of a clamping tool according to the present invention.
Figure 2:
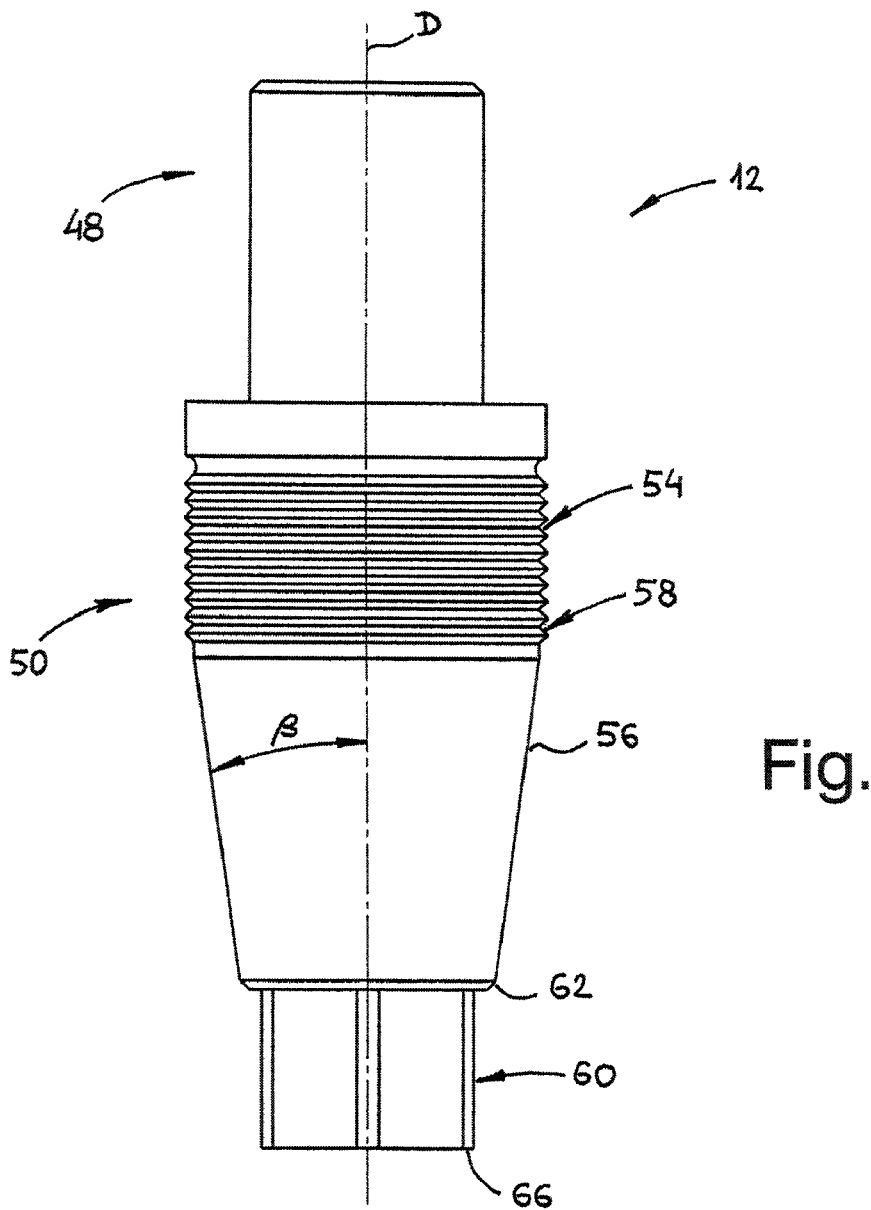
FIG. 2 is a side view of the tool of FIG. 1.

Attention is first drawn to FIGS. 1 to 5. As shown, a clamping tool 10, having an axis of rotation A, comprises a tool 12 retained within a holder 14 by a connector 16. The holder 14, having a holder axis B, has a generally conical shape and is provided with a rearwardly tapering bore 18 that extends rearwardly from a front end 20 of the holder 14. The rearwardly tapering bore 18 tapers rearwardly at a first angle $\alpha$ with respect to the holder axis B. According to a specific embodiment of the present invention, the rearwardly tapering bore 18 of the holder 14 has a rearwardly extending locating recess 22 at a rear end 24 of the rearwardly tapering bore 18. The locating recess 22 can be square in a cross-section taken perpendicularly to the axis of rotation A of the clamping tool 10. Alternatively, the locating recess 22 may be hexagonal, or have any other desired shape.

The holder 14 is further provided with a holder thread 26 having a first pitch 28. According to a specific embodiment of the present invention, the holder thread 26 is an internal thread and extends from the front end 20 of the holder 14 to the rearwardly tapering bore 18. According to a specific embodiment of the present invention, the first pitch 28 is 1.5 mm.

Figure 3:
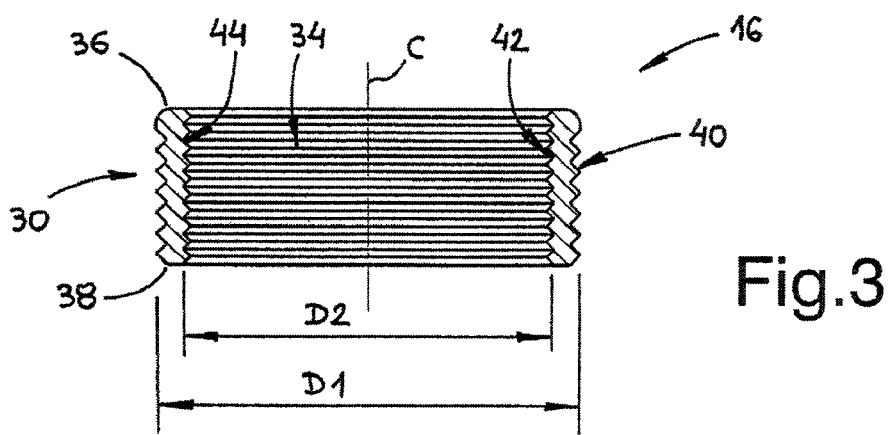
FIG. 3 is a cross-sectional side view of the connector of FIG. 1.
Figure 4:
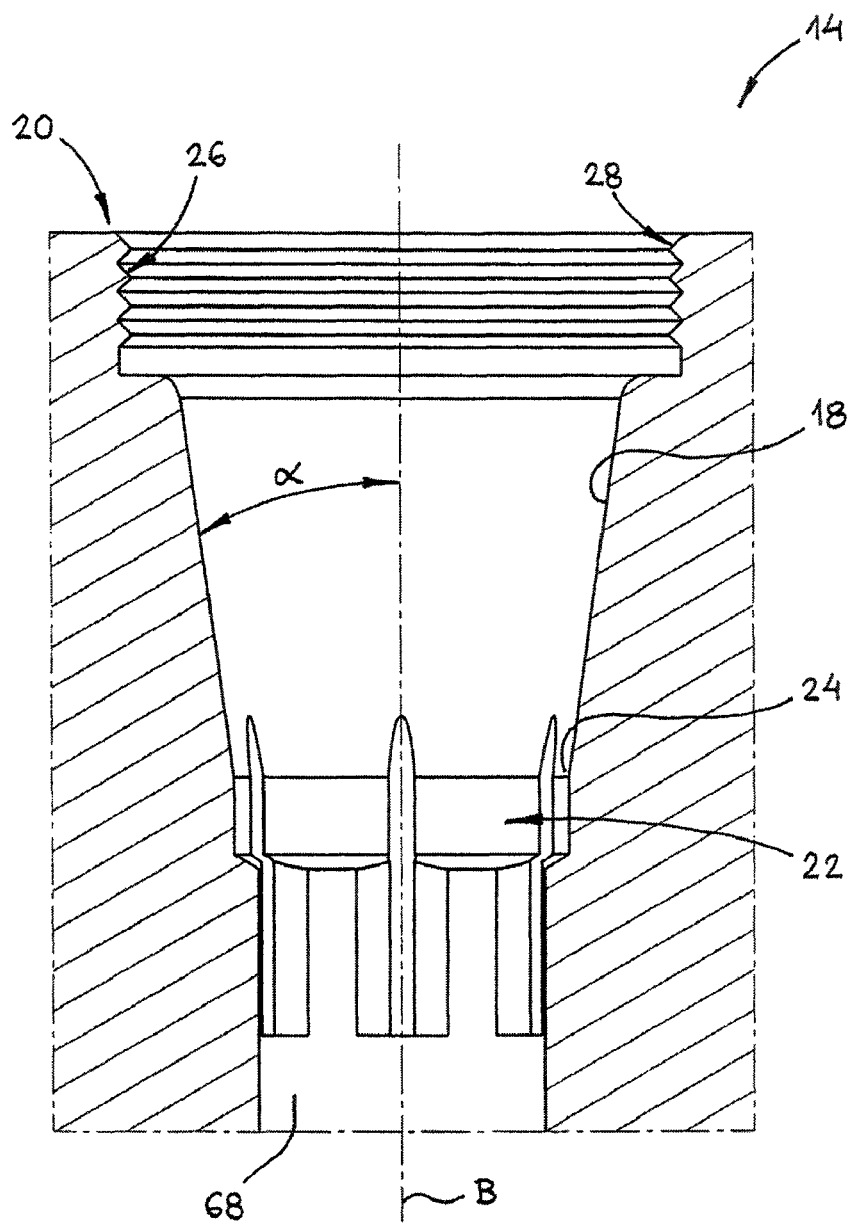
FIG. 4 is a cross-sectional partial side view of the holder of FIG. 1.
Figure 5:
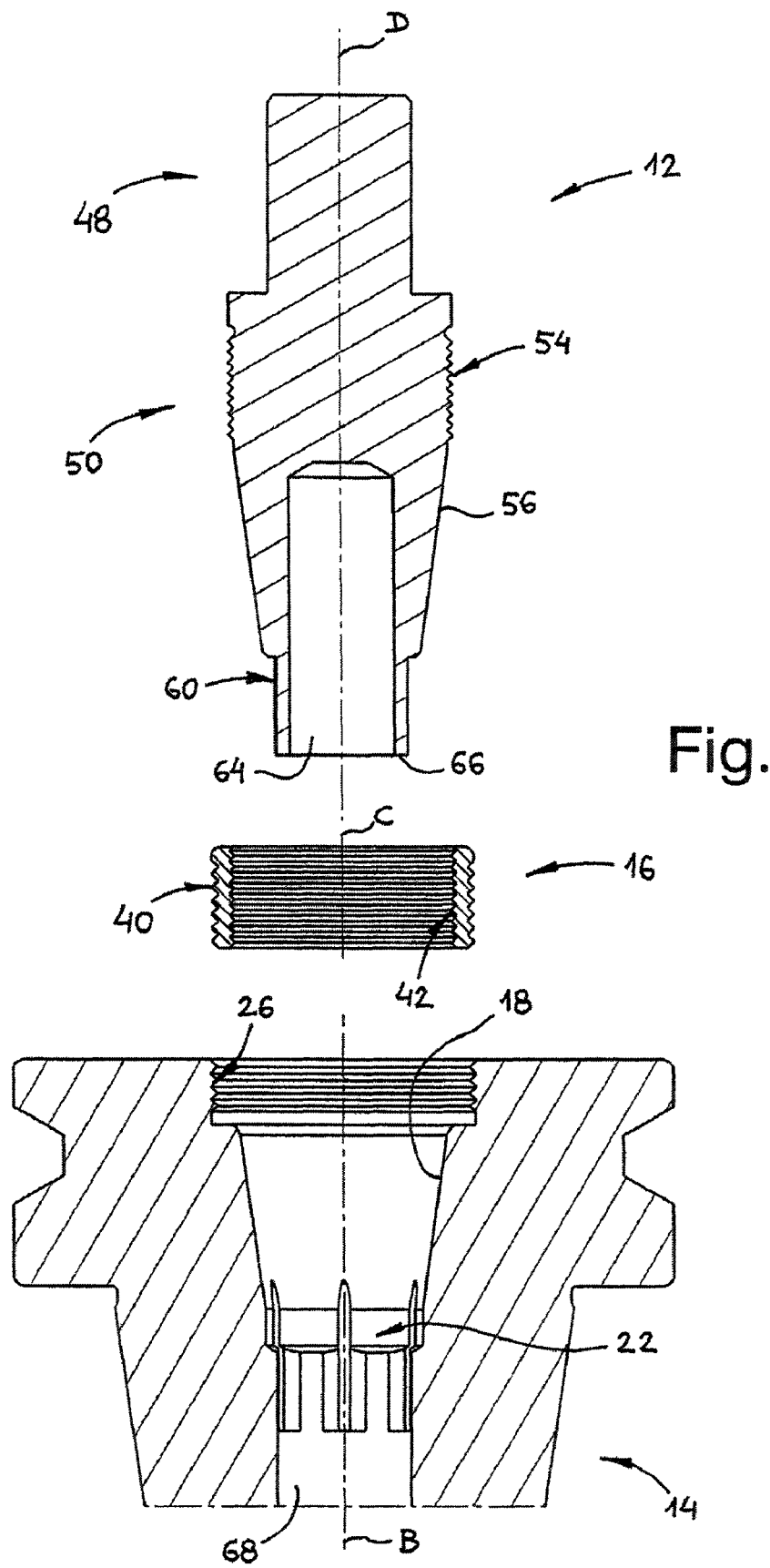
FIG. 5 is a cross-sectional exploded partial view of the clamping tool of FIG. 1.

The connector 16, having a connector axis C, has a generally cylindrical shape having a 360° peripheral surface 30. A front portion of the peripheral surface 30 is in the form of a nut 32. A connector through bore 34 extends from a front end 36 of the connector 16 to a rear end 38 of the connector 16. The connector 16 has two connector threads having a similar direction. A first connector thread 40, having a first diameter D1, extends along the peripheral surface 30 from the front end 36 of the connector 16 to the rear end 38 thereof. The first connector thread 40 has a pitch similar to the first pitch 28 of the holder thread 26. A second connector thread 42, having a second diameter D2, extends along the connector through bore 34. The second connector thread 42 has a second pitch 44 that is different from the first pitch 28. According to the present embodiment of the invention, as shown in FIG. 3, the first diameter D1 is larger than the second diameter D2.

Generally, the first pitch 28 differs from the second pitch 44 by a pitch difference value that is in the range of 0 mm to 1 mm. According to a specific embodiment of the present invention, the second pitch 44 is 1.25 mm and, accordingly, the pitch difference value is 0.25 mm.

The tool 12, having a tool axis D, may be, for example, a cutting tool. The tool 12 has a front operative portion 48 and a rear clamping portion 50, rearward to the front operative portion 48. The front operative portion 48 of the tool 12 may be, for example, a cutting head of the cutting tool. However, since the actual form of the front operative portion 48 is not an essential feature of the present invention it will not be further described.

The rear clamping portion 50 of the tool 12 has a front threaded portion 54 and a rearwardly tapering rear portion 56 rearward to the front threaded portion 54. The front threaded portion 54 constitutes a tool thread 58 having a pitch similar to the second pitch 44. The rearwardly tapering rear portion 56 tapers rearwardly at a second angle $\beta$ with respect to the tool axis D. In some embodiments, the second angle $\beta$ may be equal to the first angle $\alpha$. However, according to some specific embodiments, the second angle $\beta$ may differ from the first angle $\alpha$ as will be later described.

According to a specific embodiment of the present invention, the rearwardly tapering rear portion 56 of the tool 12 has a rearwardly extending locating protrusion 60 at a rear end 62 thereof. The shape and size of the locating protrusion 60 are adapted to mate with the locating recess 22 of the holder 14, in an assembled position of the clamping tool 10.

In accordance with some embodiments, the locating protrusion 60 and the locating recess 22 may be oppositely arranged. That is, a rear end of the rearwardly tapering rear portion of the tool may have a forwardly extending locating recess, and, the rear end of the rearwardly tapering bore of the holder may have a forwardly extending locating protrusion. The shape and size of the locating protrusion of the holder are adapted to mate with the locating recess of the tool, in an assembled position of the clamping tool.

The purpose of the locating protrusion 60 and the complementary locating recess 22 is to provide the tool 12 with a predetermined orientation with respect to the holder 14. This is particularly useful when the tool 12 is, for example, a turning cutting tool. The cross-sectional shape and size of the locating protrusion 60 and the locating recess 22 can be of any kind that may provide the required predetermined orientation therebetween. The locating protrusion 60 and the complementary locating recess 22 may also assist to transfer torque from the holder 14 to the tool 12 during tough machining conditions.

According to the present invention, the rearwardly tapering rear portion 56 of the tool 12 has a tool bore 64 that extends forwardly from a rear end 66 of the locating protrusion 60. According to another specific embodiment of the present invention, the tool 12 is not provided with a locating protrusion 60 and the tool bore extends forwardly directly from the rear end 62 of the rearwardly tapering rear portion 56.

Figure 9:
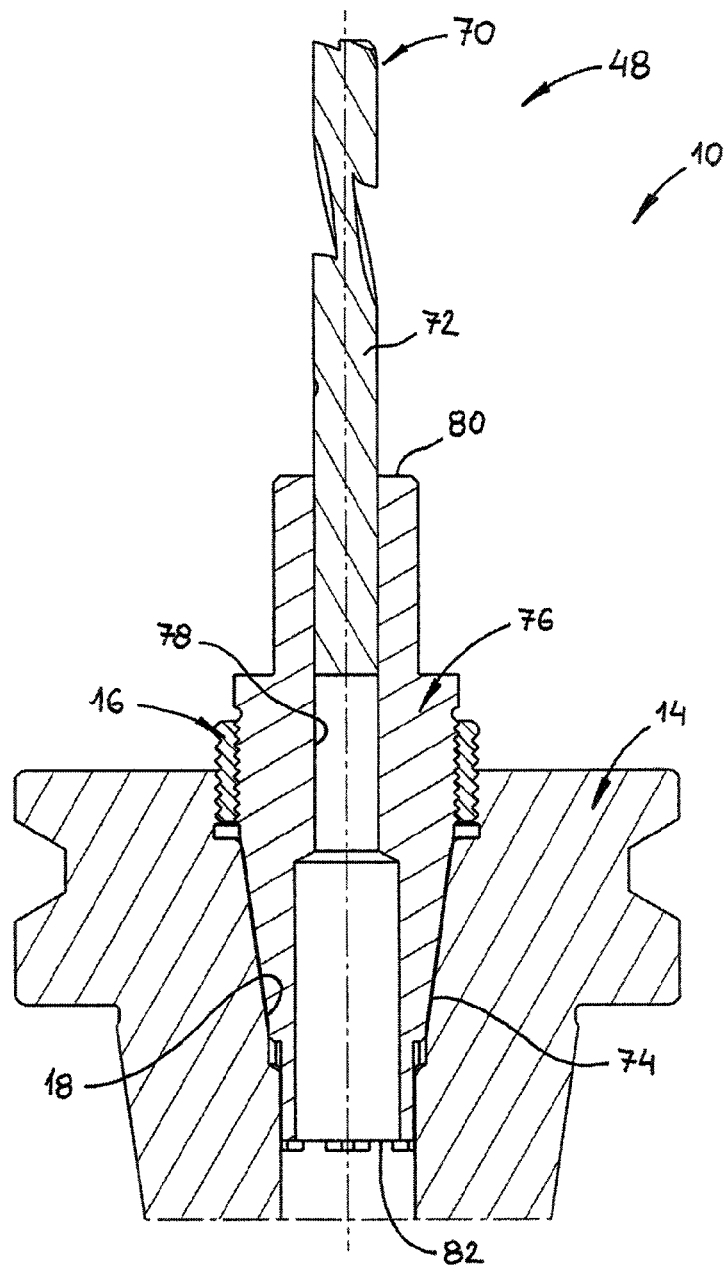
FIG. 9 is a cross-sectional partial view of a second embodiment of a clamping tool in accordance with the present invention.

The tool bore 64 provides the rearwardly tapering rear portion 56 flexibility in the radial direction for assistance in firm clamping of the tool 12 within the holder 14. If desired, the tool bore 64 may be a through bore that extends to the front operative portion 48 of the tool 12 in order to enable the supply of a cooling agent thereto, wherein, in such a case, also the holder 14 may be provided with a holder through bore 68 for conducting the cooling agent (shown, for example, in FIGS. 9 to 11).

It should be noted that according to the present invention the front operative portion 48 of the tool 12 and the rear clamping portion 50 thereof do not have to be formed from a single integral part. Thus, according to a second embodiment of the present invention, as shown, for example, in FIG. 9, the front operative portion 48 may be a cutting portion 70 of a known cylindrical tool shank 72. In that case, the rearwardly tapering rear portion 56 constitutes a peripheral surface 74 of a tool adaptor 76. The tool adaptor 76 has an adaptor bore 78 that extends rearwardly from a front end 80 of the tool adaptor 76, and the tool shank 72 is interchangeably retained within the adaptor bore 78. If desired, the adaptor bore 78 may be a through bore that extends from the front end 80 of the tool adaptor 76 to a rear end 82 thereof.

The tool adaptor 76 functions such that in an unassembled position of the clamping tool 10, the tool shank 72 is securely retained within the adaptor bore 78. This means that the tool adaptor 76 and the tool shank 72 retained therein function as a single unit. This contrasts with the use of a collet where the collet and the tool shank retained therein are held together only when they form a part of a clamping tool in a clamping position. The use of a tool adaptor 76 encounters an advantage since the same tool adaptor 76 may be utilized to retain shanks of different tools.

The tool shank 72 may be securely retained within the adaptor bore 78 by various methods known in the art. However, according to a specific embodiment of the present invention, it is advantageous to securely retain the tool shank 72 within the adaptor bore 78 by a shrink fit connection.

Figure 6:
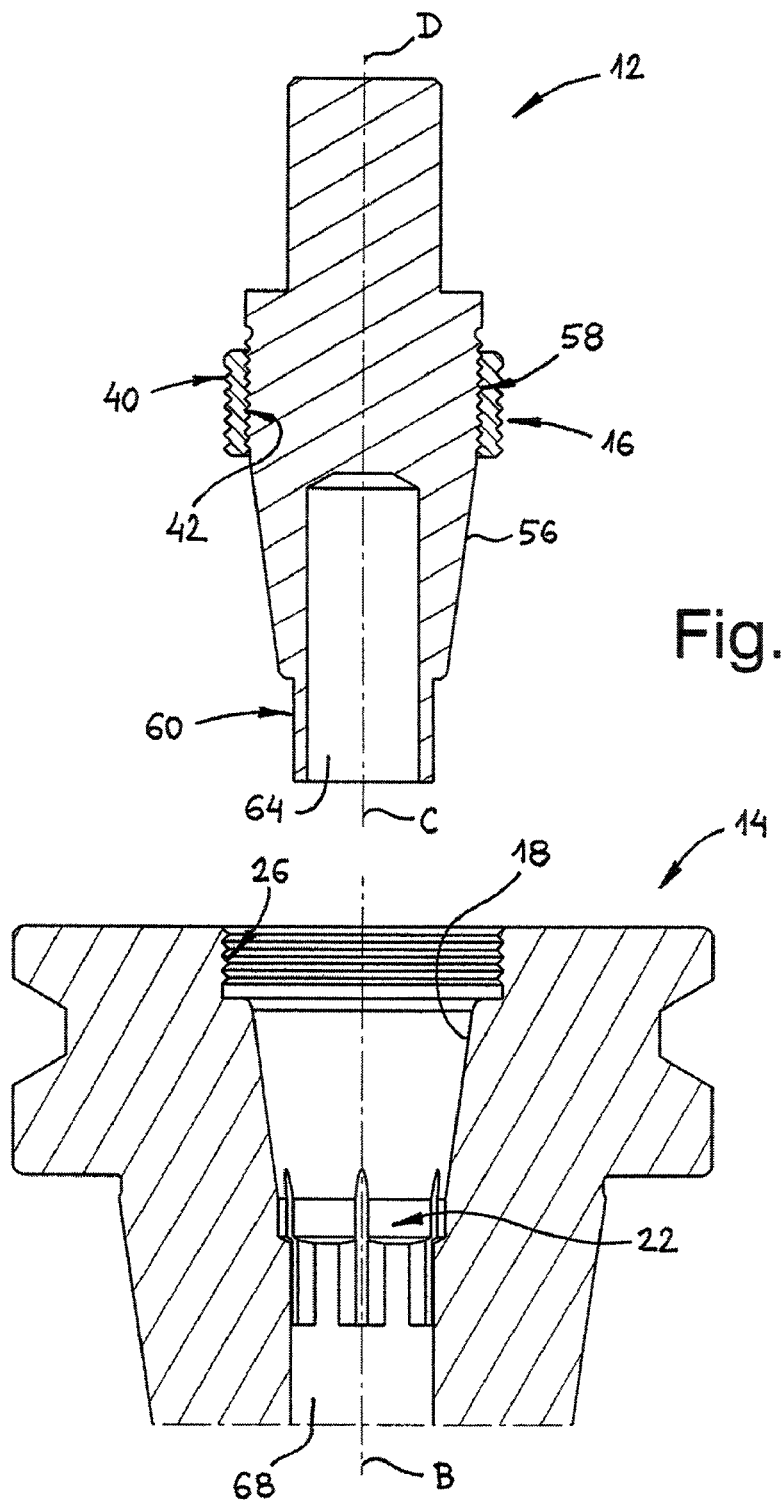
FIG. 6 is a cross-sectional partial view of the clamping tool of FIG. 1 at a first clamping stage.
Figure 7:
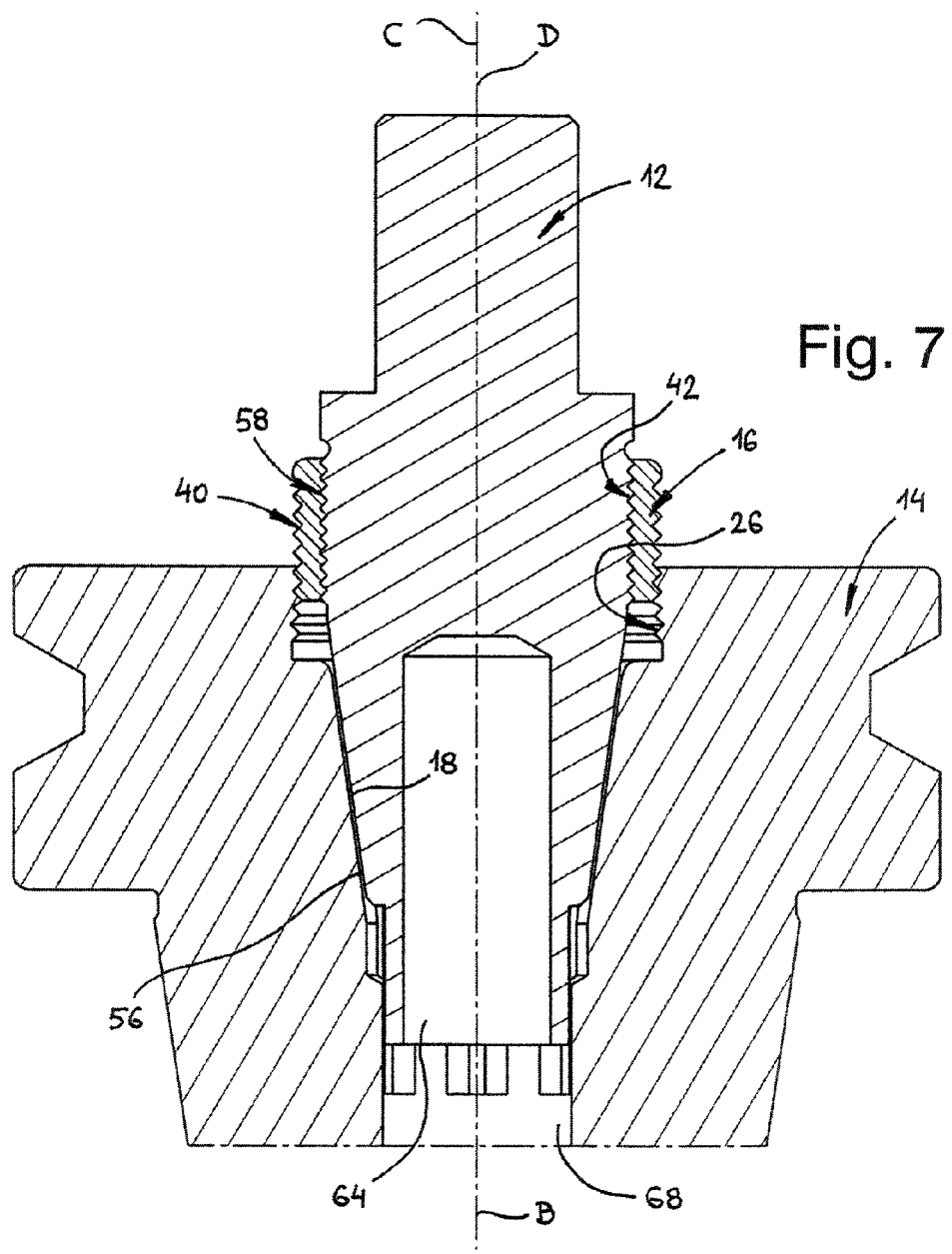
FIG. 7 is a cross-sectional partial view of the clamping tool of FIG. 1 at a second clamping stage.
Figure 8:
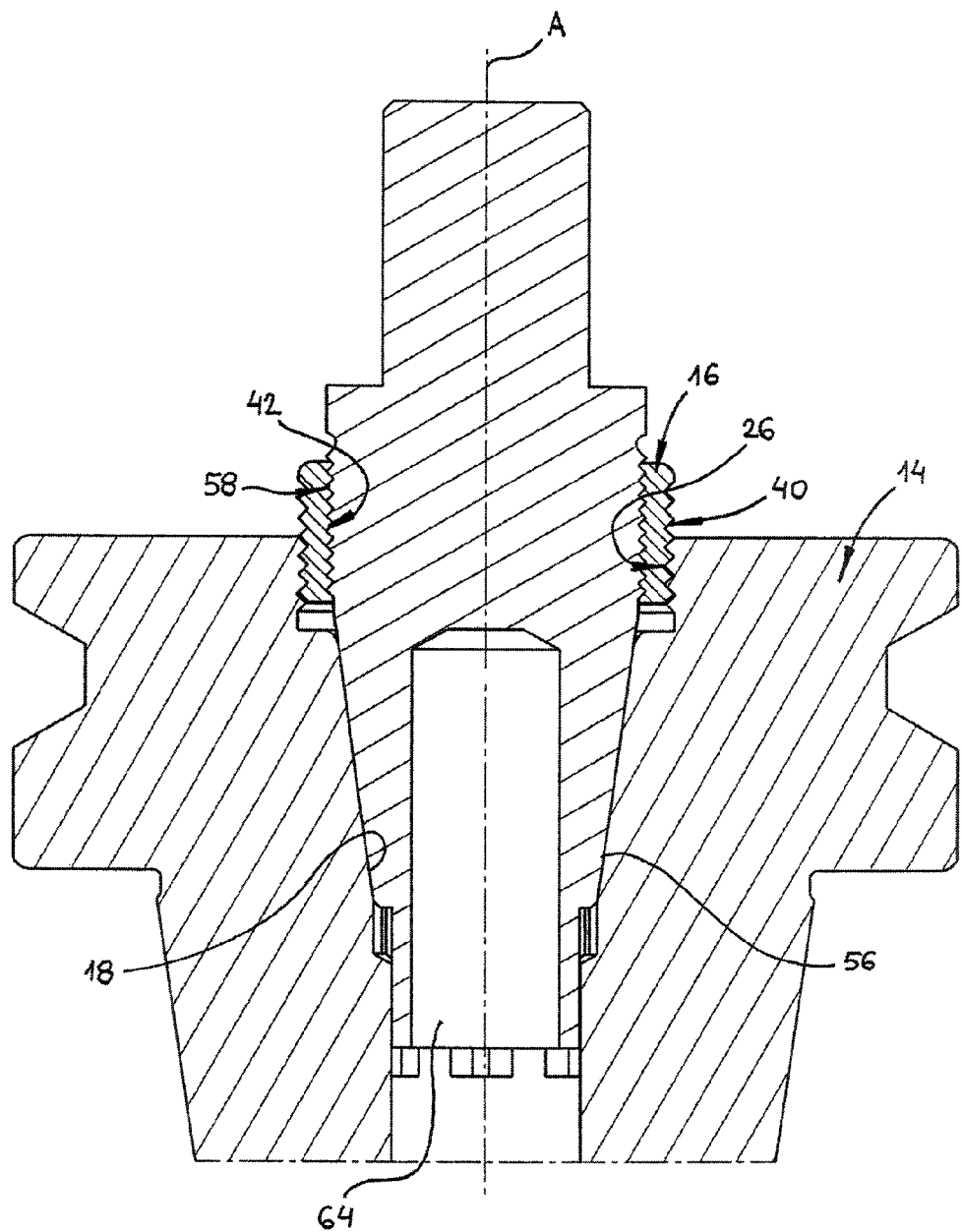
FIG. 8 is a cross-sectional partial view of the clamping tool of FIG. 1 at a third clamping stage.

Attention now is further drawn to FIGS. 6 to 8, for describing the various stages of assembling the clamping tool 10.

At a first stage of assembling, as shown in FIG. 6, the tool 12 is initially separated from, and located forwardly of, the connector 16 such that the tool axis D and the connector axis C are axially aligned. The tool thread 58 is then threadingly engaged with the second connector thread 42. This forms a first tool subassembly comprising the tool 12 and the connector 16 (see upper half of FIG. 6).

At a second stage of assembling, as shown in FIG. 7, the tool 12 and the connector 16 threadingly engaged therewith are axially aligned with the holder axis B. Then, the first connector thread 40 is threadingly engaged with the holder thread 26. At this stage, the tool 12 rotates together with the connector 16, thereby having no relative displacement therewith. At the same time, with each turn of the connector 16, the tool 12 is drawn further into the holder 14 by the size of the first pitch 28 of the first connector thread 40.

At the third stage of assembling, as shown in FIG. 8, the rearwardly tapering rear portion 56 of the tool 12 comes into first contact with the rearwardly tapering bore 18 of the holder 14. Now, with each turn of the connector 16, the connector 16 is displaced axially rearwardly onto the holder 14 a distance equal to the first pitch 28. At the same time, since the rearwardly tapering rear portion 56 of the tool 12 is in contact with the rearwardly tapering bore 18 of the holder 14, the connector 16 is displaced axially rearwardly with respect to the tool 12 a distance equal to the second pitch 44.

As a consequence of the two combined movements described above, with each turn of the connector 16, the tool 12 is displaced axially rearwardly into the holder 14 a distance that is equal to the pitch difference value, i.e., the difference between the first pitch 28 and the second pitch 44. According to a specific embodiment of the present invention, the tool 12 is axially displaced 0.25 mm into the holder 14 with each turn of the connector 16. Thus, due to the difference between the first pitch 28 and the second pitch 44, a mechanical advantage is obtained when tightening the tool 12 against the holder 14 by means of the connector 16. Therefore, turning the connector 16 effects a relatively small axial displacement of the tool 12 against the holder 14, thus increasing the clamping force that is obtained.

During the final tightening of the connector 16 onto the holder 14, to reach the assembled position of the clamping tool 10, the rearwardly tapering rear portion 56 of the tool 12 comes into full abutment with the rearwardly tapering bore 18 of the holder 14.

Thus, as described above, rigid and accurate clamping may be obtained by directly clamping the tool 12 into the holder 14 and avoiding unnecessary degrees of freedom in the clamping tool 10. Due to this direct clamping, the tool 12, holder 14 and connector 16 are connected to one another to form a tool without the use of a collet. This contrasts with the aforementioned U.S. Pat. No. 5,758,883, which requires a collet. As such, the tool 12 and the connector 16 are threadingly engaged to another without an intervening collet.

Therefore, the clamping tool 10 enables higher torque transfer and machining at higher power. The clamping tool 10 according to the present invention may have a price advantage in the long term since fewer tools may be broken during machining due to the fact that they operate in more stable conditions in comparison to prior art tools.

As mentioned above, the first angle α does not have to be equal to the second angle β. Thus, according to a specific embodiment of the present invention, the first angle α may be slightly larger than the second angle β thereby ensuring that the first contact between the rearwardly tapering rear portion 56 of the tool 12 and the rearwardly tapering bore 18 of the holder 14 will take place first at the rear end 24 of the rearwardly tapering bore 18. This ensures a great degree of accuracy in the concentricity of the tool 12 with respect to the holder 14.

Typically, a first difference value between the first angle α and the second angle β may be in the range of 0° to 0.01°, depending upon the elasticity of the materials from which the clamping tool 10 is made of. According to a specific embodiment of the present invention, the first difference value is in the range of 0.002° to 0.004°. Further according to a specific embodiment of the present invention, the first angle α is larger than the second angle β by approximately 0.003°.

Typically, after the first contact between the rearwardly tapering rear portion 56 of the tool 12 and the rearwardly tapering bore 18 of the holder 14, the final tightening of the connector 16 onto the holder 14 ensures that the rearwardly tapering rear portion 56 of the tool 12 comes into full abutment with the rearwardly tapering bore 18 of the holder 14. This is enabled by the inward compression of the rearwardly tapering rear portion 56 of the tool 12 due to the tool bore 64 that provides the necessary flexibility.

Figure 10:
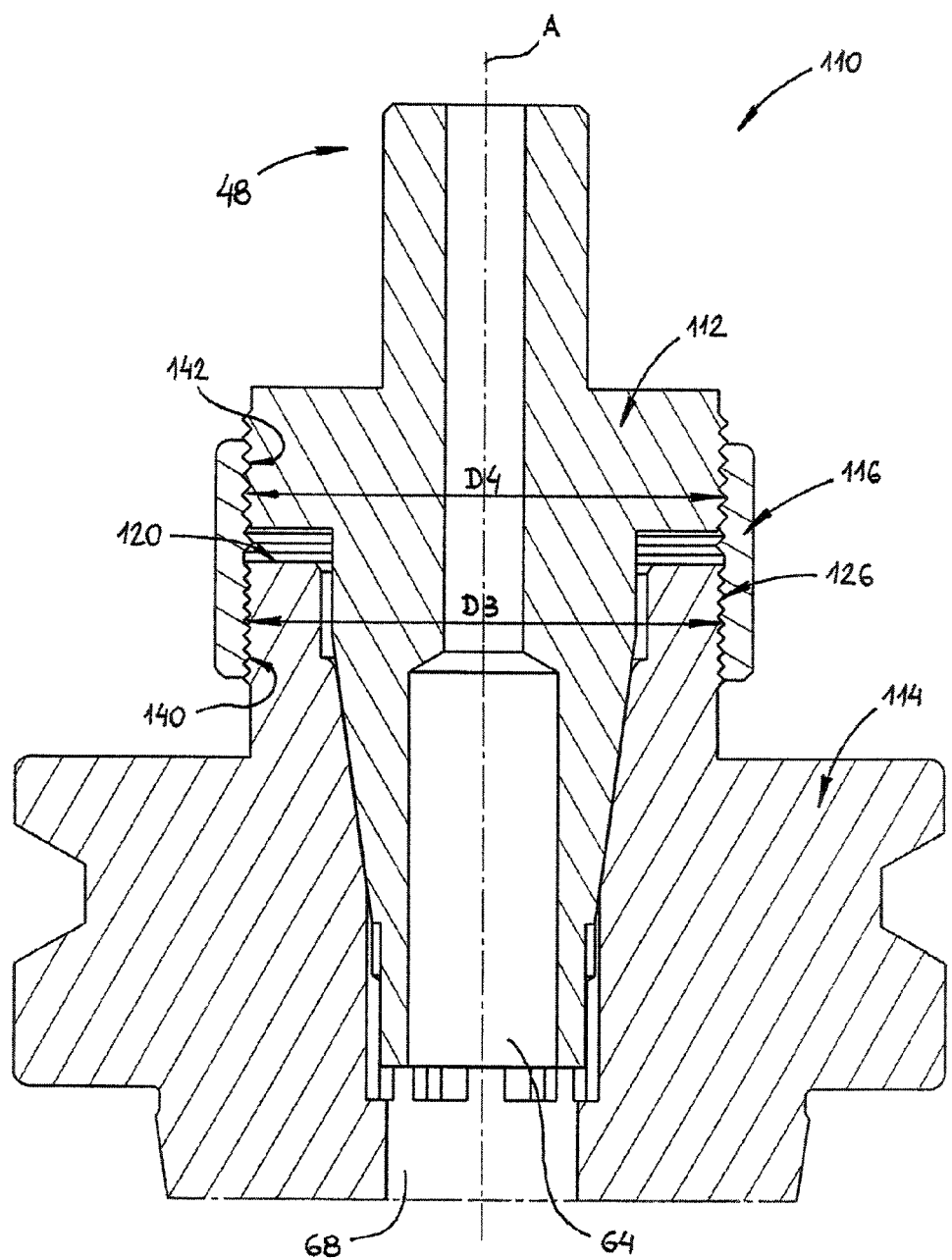
FIG. 10 is a cross-sectional partial view of a third embodiment of a clamping tool in accordance with the present invention.
Figure 11:
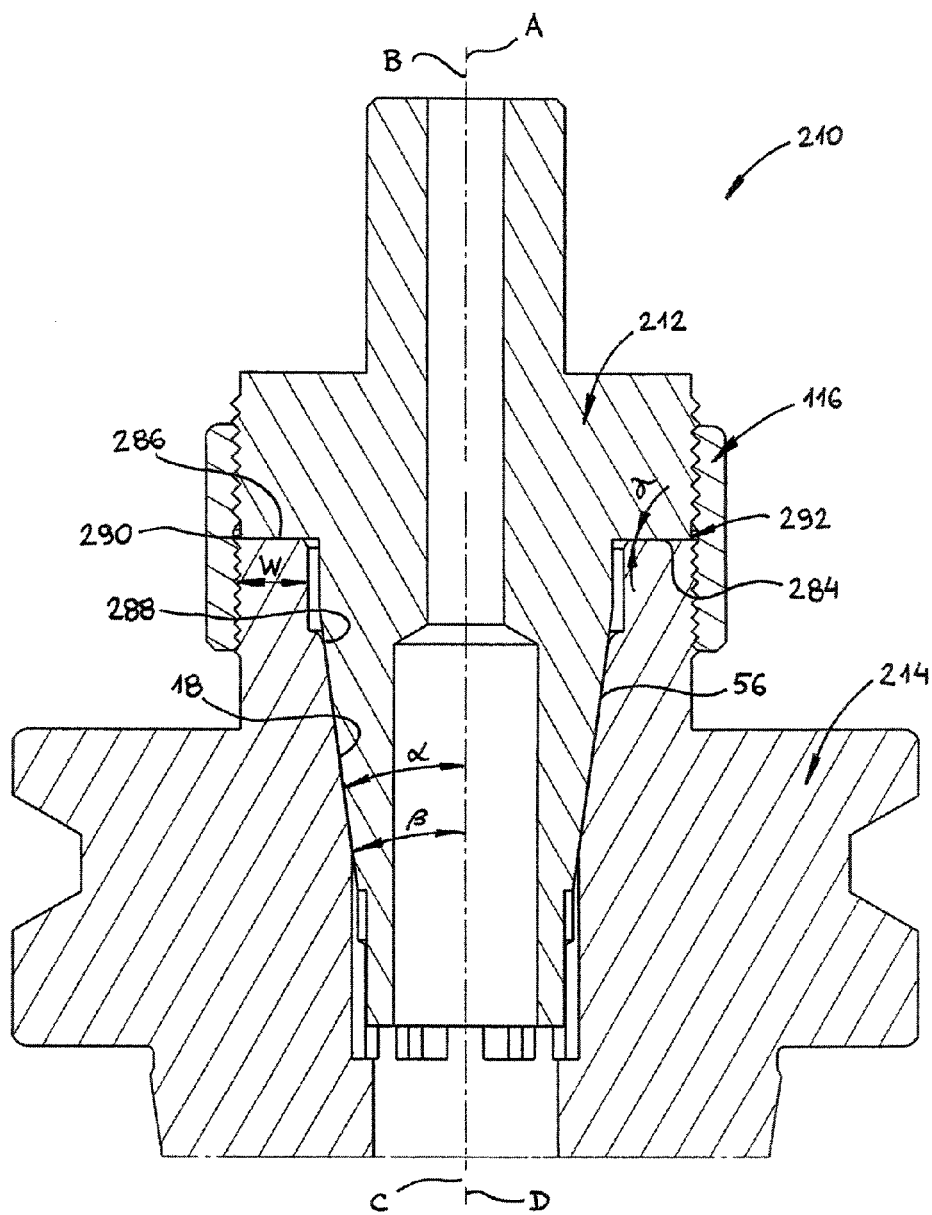
FIG. 11 is a cross-sectional partial view of a fourth embodiment of a clamping tool in accordance with the present invention.

Reference will now be made to FIGS. 10 and 11, in which like reference numerals refer to like parts in FIGS. 1 to 9.

FIG. 10 shows a clamping tool 110 in accordance with a third embodiment of the present invention. As shown, the clamping tool 110 comprises a tool 112 retained within a holder 114 by a connector 116. The holder 114 has a holder thread 126. In accordance with a specific embodiment of the present invention, the holder thread 126 is an external thread and is located adjacent a front end 120 of the holder 114. The connector 116 has a first connector thread 140, having a third diameter D3 and the first pitch, and a second connector thread 142, having a fourth diameter D4 and the second pitch, wherein both the first and second connector threads 140, 142 are internal and the third diameter D3 is equal to the fourth diameter D4.

It is noted that the embodiment shown in FIG. 10 may have other configurations. For example, the first connector thread 140 and the second connector thread 142 may still be internal threads, however, they may be arranged such that the third diameter D3 is different from the fourth diameter D4. Furthermore, the first pitch may be larger than the second pitch, or, alternatively, the first pitch may be smaller than the second pitch.

FIG. 11 shows a clamping tool 210 according to a fourth embodiment of the present invention. In addition to the clamping tool 110 shown in FIG. 10, the clamping tool 210 of FIG. 11 is provided with a tool 212 and a holder 214 having additional features. Thus, the tool 212 of FIG. 11 has a rearwardly facing annular surface 284, constituting an axial abutment surface of the tool 212. The rearwardly facing annular surface 284 is located forward to the rearwardly tapering rear portion 56 of the tool 212. The holder 214 has a forwardly facing annular surface 286, constituting an axial abutment surface of the holder 214. The forwardly facing annular surface 286 is located forward to the rearwardly tapering bore 18 of the holder 214. Typically, the rearwardly facing annular surface 284 of the tool 212 and the forwardly facing annular surface 286 of the holder 214 are planar and perpendicular to the axis of rotation A of the clamping tool 210.

Typically, when utilizing the clamping tool 210 of FIG. 11, the first angle α, which is the tapering angle of the rearwardly tapering bore 18 with respect to the holder axis B, is smaller than the second angle β, which is the tapering angle of the rearwardly tapering rear portion 56 of the tool 212 with respect to the tool axis D.

This structure guarantees that during the tightening of the connector 116 on the holder 214, the rearwardly tapering rear portion 56 of the tool 212 comes into first contact with the rearwardly tapering bore 18 of the holder 214 at a front portion 288 of the rearwardly tapering bore 18. This first contact assures accurate concentricity between the tool 212 and the holder 214. Furthermore, additional tightening of the connector 116 brings the rearwardly facing annular surface 284 of the tool 212 to abut the forwardly facing annular surface 286 of the holder 214. This is facilitated due to the flexibility of the relatively thin wall thickness W of the front portion 288 of the rearwardly tapering bore 18 of the holder 214. In addition, after assurance that the rearwardly facing annular surface 284 of the tool 212 firmly abuts the forwardly facing annular surface 286 of the holder 214, the rearwardly tapering rear portion 56 of the tool 212 increases its abutment against the rearwardly tapering bore 18 of the holder 214.

The additional face contact obtained between the tool 212 and the holder 214 creates very firm and stable clamping while ensuring very good concentricity of the tool 212 and the holder 214, and very good perpendicularity therebetween and the axis of rotation A of the clamping tool 210 in an assembled position of the clamping tool 210.

Typically, a second difference value between the first angle α and the second angle β may be in the range of 0° to 0.01°. According to a specific embodiment of the present invention, the second difference value is in the range of 0.002° to 0.004°. Further according to a specific embodiment of the present invention, the first angle α is smaller than the second angle β by approximately 0.003°.

According to a specific embodiment of the present invention, as shown in FIG. 11, the rearwardly facing annular surface 284 of the tool 212 tapers forwardly at a third angle γ from a periphery 290 of the rearwardly facing annular surface 284 to the tool axis D. The forward tapering of the third angle γ guarantees that the first contact between the axial abutment surfaces of the tool 212 and the holder 214 will take place first at a periphery 292 of the axial abutment surfaces therefore assuring firm and stable clamping and very good perpendicularity therebetween and the axis of rotation A of the clamping tool.

Typically, the third angle γ is in the range of 0° to 0.1°. According to a specific embodiment of the present invention, the third angle γ is in the range of 0.03° to 0.05°. Further according to a specific embodiment of the present invention, the third angle γ is approximately 0.04°.

Although the present invention has been described to a certain degree of particularity, it should be understood that various alterations and modifications could be made without departing from the spirit or scope of the invention as hereinafter claimed.

The invention claimed is:

1. A clamping tool (10, 110, 210) having an axis of rotation (A) and comprising:
    a holder (14, 114, 214) having a rearwardly tapering bore (18) that extends rearwardly from a front end (20, 120) of the holder (14, 114, 214), the rearwardly tapering bore (18) tapering rearwardly at a first angle (α), the holder (14, 114, 214) being provided with a holder thread (26, 126) having a first pitch (28);
    a connector (16, 116) having a 360° peripheral surface (30) with a generally cylindrical shape and a connector through bore (34) that extends from a front end (36) of the connector (16, 116) to a rear end (38) of the connector (16, 116), the connector (16, 116) having a first connector thread (40, 140) with a pitch similar to the first pitch (28), and a second connector thread (42, 142) with a second pitch (44) which differs from the first pitch (28);
    a tool (12, 112, 212) having a rearwardly tapering rear portion (56), the rearwardly tapering rear portion (56) tapering rearwardly at a second angle (β), the tool (12, 112, 212) being provided with a tool thread (58) having a pitch similar to the second pitch (44);
    wherein in an assembled position:
    the rearwardly tapering rear portion (56) of the tool (12, 112, 212) abuts the rearwardly tapering bore (18) of the holder (14, 114, 214);
    the holder thread (26, 126) is threadingly engaged with the first connector thread (40, 140); and
    the tool thread (58) is threadingly engaged with the second connector thread (42, 142).

2. The clamping tool (210) according to claim 1, wherein:
the tool (212) has a rearwardly facing annular surface (284) located forward to the rearwardly tapering rear portion (56);
the holder (214) has a forwardly facing annular surface (286) located forward to the rearwardly tapering bore (18); and wherein:
in the assembled position, the rearwardly facing annular surface (284) of the tool (212) abuts the forwardly facing annular surface (286) of the holder (214).

3. The clamping tool (210) according to claim 2, wherein the rearwardly facing annular surface (284) of the tool (212) tapers forwardly at a third angle (γ) from a periphery (290) of the rearwardly facing annular surface (284) to a tool axis (D).

4. The clamping tool (10, 110, 210) according to claim 1, wherein the first angle (α) is equal to the second angle (β).

5. The clamping tool (10, 110) according to claim 1, wherein the first angle (α) is larger than the second angle (β).

6. The clamping tool (10, 110) according to claim 5, wherein the first angle (α) is larger than the second angle (β) by a first difference value that is in the range of 0° to 0.01°.

7. The clamping tool (10, 210) according to claim 1, wherein the first angle (α) is smaller than the second angle (β).

8. The clamping tool (10, 210) according to claim 7, wherein the first angle (α) is smaller than the second angle (β) by a second difference value that is in the range of 0° to 0.01°.

9. The clamping tool (10) according to claim 1, wherein:
the first connector thread (40) has a first diameter (D1);
the second connector thread (42) has a second diameter (D2); and
the first diameter (D1) is different from the second diameter (D2).

10. The clamping tool (10) according to claim 9, wherein the first diameter (D1) is larger than the second diameter (D2).

11. The clamping tool (10) according to claim 10, wherein the first connector thread (40) is an external thread and the second connector thread (42) is an internal thread.

12. The clamping tool (110, 210) according to claim 1, wherein:
the first connector thread (140) has a third diameter (D3);
the second connector thread (142) has a fourth diameter (D4);
and the third diameter (D3) is equal to the fourth diameter (D4).

13. The clamping tool (110, 210) according to claim 1, wherein:
the first connector thread (140) has a third diameter (D3);
the second connector thread (142) has a fourth diameter (D4); and
the third diameter (D3) is different from the fourth diameter (D4).

14. The clamping tool (10) according to claim 1, wherein the holder thread (26) is an internal thread.

15. The clamping tool (110, 210) according to claim 1, wherein the holder thread (126) is an external thread.

16. The clamping tool (10, 110, 210) according to claim 1, wherein the first pitch (28) is larger than the second pitch (44).

17. The clamping tool (10, 110, 210) according to claim 16, wherein the first pitch (28) is larger than the second pitch (44) by a pitch difference value that is in the range of 0 mm to 1 mm.

18. The clamping tool (10, 110, 210) according to claim 1, wherein:
the rearwardly tapering rear portion (56) of the tool (12, 112, 212) has a rearwardly extending locating protrusion (60) at a rear end (62) thereof;
the rearwardly tapering bore (18) of the holder (14, 114, 214) has a rearwardly extending locating recess (22) at a rear end (24) thereof; and wherein:
in the assembled position, the locating protrusion (60) is located within the locating recess (22) and adapted thereto.

19. The clamping tool (10, 110, 210) according to claim 1, wherein the rearwardly tapering rear portion (56) of the tool (12, 112, 212) has a tool bore (64) that extends forwardly from a rear end (62) of the rearwardly tapering rear portion (56).

20. The clamping tool (10, 110, 210) according to claim 19, wherein the tool bore (64) is a through bore.

21. The clamping tool (10, 110, 210) according to claim 1, wherein:
the rearwardly tapering rear portion (56) of the tool (12, 112, 212) constitutes a peripheral surface (74) of a tool adaptor (76);
the tool adaptor (76) has an adaptor bore (78) that extends rearwardly from a front end (80) of the tool adaptor (76); and
a tool shank (72) is interchangeably retained within the adaptor bore (78).

22. The clamping tool (10, 110, 210) according to claim 21, wherein in an unassembled position of the clamping tool (10, 110, 210), the tool shank (72) is securely retained within the adaptor bore (78).

23. The clamping tool (10, 110, 210) according to claim 22, wherein the tool shank (72) is securely retained within the adaptor bore (78) by a shrink fit connection.

24. The clamping tool (10, 110, 210) according to claim 1, wherein the tool (12, 112, 212) is a cutting tool.

25. The clamping tool (10, 110, 210) according to claim 1, wherein the tool 12, the holder 14 and the connector 16 are connected to one another without the use of a collet.

* * * * *